(12) United States Patent
McHale et al.

(10) Patent No.: US 9,409,758 B2
(45) Date of Patent: Aug. 9, 2016

(54) FAUCET-INTEGRATED CARBONATION SYSTEMS AND METHODS

(71) Applicant: AS IP Holdco, LLC, Piscataway, NJ (US)

(72) Inventors: James McHale, Hillsborough, NJ (US); Walter Pitsch, Washington, NJ (US); Xiao Jing Ye, Edison, NJ (US)

(73) Assignee: AS IP Holdco, LLC, Piscataway, NJ (US)

(*) Notice: Subject to any disclaimer, the term of this patent is extended or adjusted under 35 U.S.C. 154(b) by 190 days.

(21) Appl. No.: 14/328,377

(22) Filed: Jul. 10, 2014

(65) Prior Publication Data

US 2015/0037464 A1    Feb. 5, 2015

Related U.S. Application Data

(60) Provisional application No. 61/844,638, filed on Jul. 10, 2013.

(51) Int. Cl.
| | | |
|---|---|---|
| *B01F 3/04* | (2006.01) |
| *A23L 2/00* | (2006.01) |
| *B67D 1/00* | (2006.01) |
| *A23L 2/54* | (2006.01) |

(52) U.S. Cl.
CPC ............... *B67D 1/0059* (2013.01); *A23L 2/00* (2013.01); *A23L 2/54* (2013.01); *B01F 3/04099* (2013.01); *B01F 3/04439* (2013.01); *B01F 3/04808* (2013.01); *A23V 2002/00* (2013.01); *B01F 2003/049* (2013.01);
(Continued)

(58) Field of Classification Search
CPC .. B67D 1/0057; B67D 1/0058; B67D 1/0071; B01F 3/04; B01F 3/04099; B01F 3/04787; B01F 3/04808

USPC ........ 261/30, 64.1, 66, 119.1, 121.1, DIG. 7; 99/323.1
See application file for complete search history.

(56) References Cited

U.S. PATENT DOCUMENTS

| | | | |
|---|---|---|---|
| 5,021,250 A | | 6/1991 | Ferguson |
| 5,417,147 A | * | 5/1995 | Mason ................ B01F 3/04808 261/64.5 |

(Continued)

FOREIGN PATENT DOCUMENTS

| | | |
|---|---|---|
| EP | 1091050 | 4/2001 |
| WO | WO00/29769 | 5/2000 |

OTHER PUBLICATIONS

International Search Report, International Application No. PCT/US2014/046197, Date of Mailing Nov. 3, 2014.
(Continued)

*Primary Examiner* — Robert A Hopkins
(74) *Attorney, Agent, or Firm* — Kramer Levin Naftalis & Frankel LLP

(57) ABSTRACT

Systems and methods are disclosed for providing carbonated water through a typical kitchen faucet. The faucet-integrated carbonation system can include a carbonated water reservoir coupled to a residential or commercial cold water supply line as well as a $CO_2$ tank, all of which can be mounted under a kitchen countertop or the like. The water held in the reservoir can be carbonated using the $CO_2$ when a user activates a $CO_2$ activation mechanism. The system can further include a carbonated water on/off valve for dispensing carbonated water from the carbonated water reservoir via a waterway with an outlet disposed at the end of the faucet.

20 Claims, 14 Drawing Sheets

(52) U.S. Cl.
CPC ............... *B01F 2003/04822* (2013.01); *B01F 2003/04943* (2013.01); *B67D 1/0075* (2013.01); *B67D 2001/0092* (2013.01); *B67D 2001/0094* (2013.01)

(56) References Cited

U.S. PATENT DOCUMENTS

| | | | |
|---|---|---|---|
| 5,417,348 | A | 5/1995 | Perrin et al. |
| 6,060,092 | A | 5/2000 | Oesterwind et al. |
| 2003/0137896 | A1 | 7/2003 | Spiegel |
| 2004/0206244 | A1 | 10/2004 | Spiegel et al. |
| 2008/0272211 | A1 | 11/2008 | Rann et al. |

OTHER PUBLICATIONS

Grohe Blue Grohe Blue Chilled & Sparkling Grohe Blue Pure, pp. 13, http://www.grohe.com/us/19523/kitchen/water-filter-kitchen-faucets/grohe-blue-chilled-sparkling/, Mar. 26, 2013.

* cited by examiner

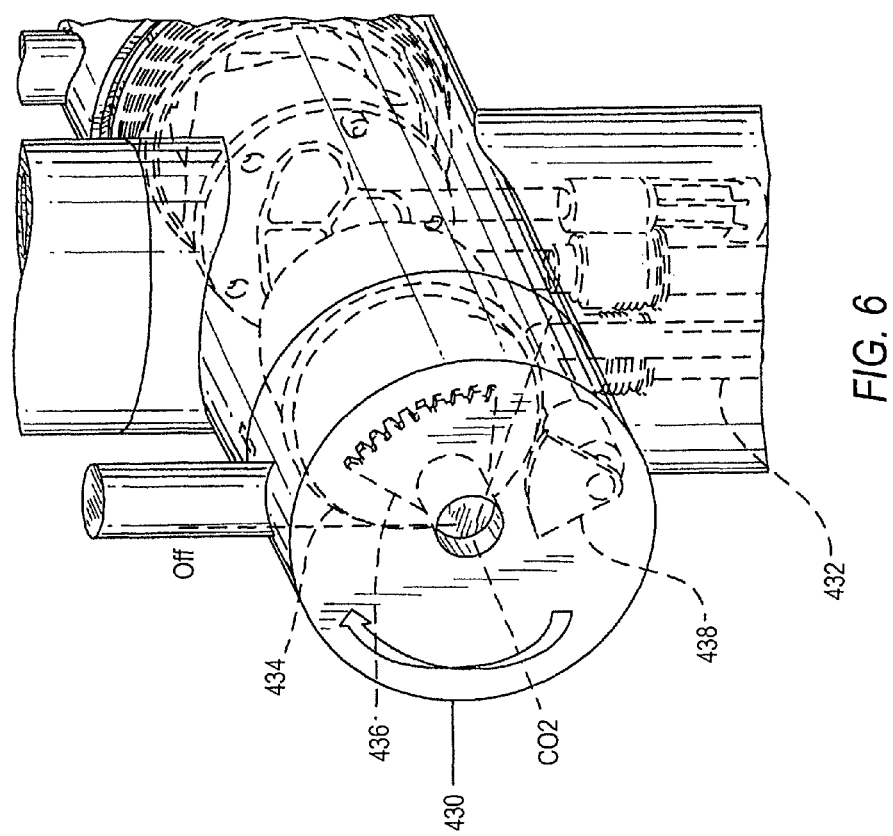

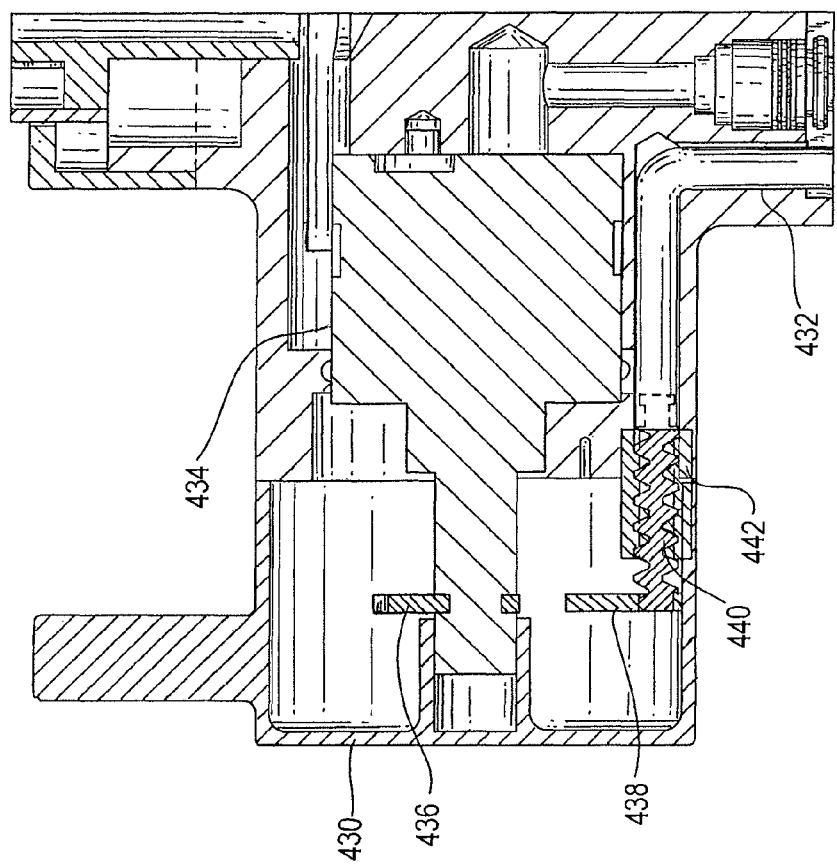

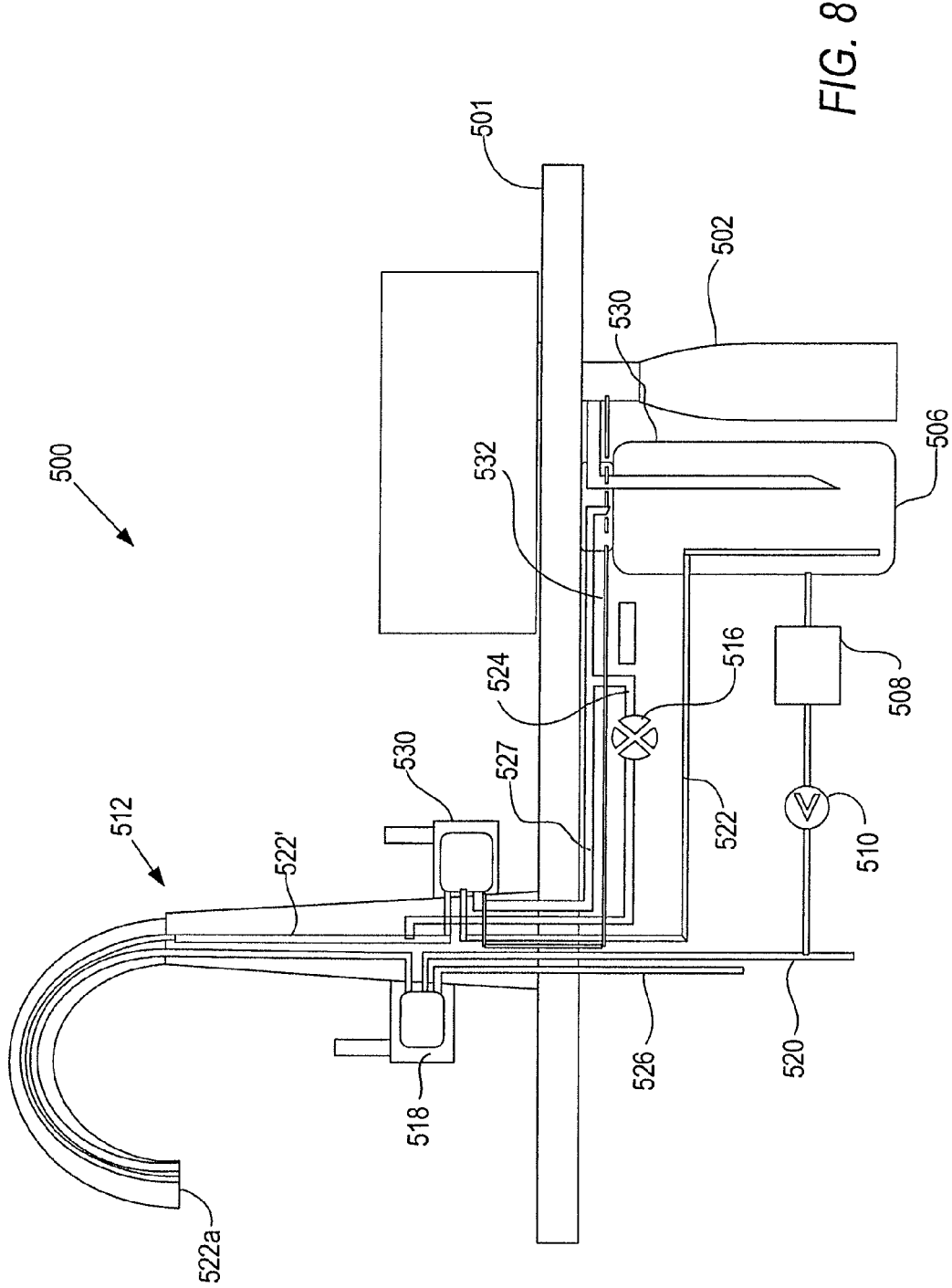

FAUCET-INTEGRATED CARBONATION SYSTEMS AND METHODS

CROSS-REFERENCE TO RELATED PROVISIONAL APPLICATION

This application claims the benefit of U.S. Provisional Application No. 61/844,638, filed on Jul. 10, 2013, the disclosure of which is hereby incorporated by reference herein in its entirety.

FIELD OF THE INVENTION

The present invention generally relates to faucet-integrated systems and methods for delivery and production of carbonated water.

BACKGROUND OF THE DISCLOSURE

Carbonation systems are available to generate carbonated water for commercial and residential use. The carbonated water generated by such systems can be enjoyed as-is or mixed with various additives to create flavored beverages.

Most carbonation systems are stand-alone products designed to sit on a countertop, occupying valuable kitchen real estate. Such countertop systems typically utilize carbonation cartridges to carbonate a user-provided vessel of water. It is often incumbent upon the user to estimate the correct amount of carbonation for the provided volume of water.

Faucet-integrated carbonation systems are also commercially available. However, these products require both refrigeration systems and electronic controls, which drive up the cost and price points to a range that is out of reach for many consumers.

There is therefore a need for a simple, mechanical carbonation system that can be installed under-counter and coupled to an above-counter faucet in an aesthetically pleasing and elegant manner.

SUMMARY OF THE DISCLOSURE

Generally speaking, faucet-integrated carbonation systems and methods are disclosed, which can provide a faucet-integrated beverage system that can combine the function of a common faucet with a simple, mechanical production and delivery system for carbonated water. The faucet-integrated carbonation systems can include a standard mixing valve in fluid communication with hot and cold supply lines for supplying water of varying temperature in addition to a second internal waterway for dispensing carbonated water produced in a carbonation system that can be mounted under a countertop or otherwise disposed beneath a sink (e.g., as a stand-alone unit on the floor of a cabinet or other enclosure).

The carbonation system can include a carbonated water reservoir in fluid communication with a carbon dioxide ("$CO_2$") tank. To carbonate water within the carbonated water reservoir, a user can activate a $CO_2$ activation mechanism, which can be mounted above the countertop or even integrated into the faucet controls for easy accessibility.

The carbonated water reservoir can be fitted with a pressure relief line that can include a pressure relief valve for preventing over-pressurization of the carbonated water reservoir. When the water in the carbonated water reservoir is sufficiently carbonated, the user can utilize a carbonated water on/off valve mounted on the faucet body to dispense carbonated water from the faucet. According to various embodiments, the water level in the carbonated water reservoir can be maintained manually or automatically using a pressure regulator disposed inline between the cold water supply line and the carbonated water reservoir. The pressure of $CO_2$ above the carbonated water in the carbonated water reservoir can be sufficient to dispense the carbonated water via the tap of the faucet.

Still other objects and advantages of the present invention will in part be obvious and will in part be apparent from the specification.

The present invention accordingly comprises the features of construction, combination of elements, arrangement of parts, and the various steps and the relation of one or more of such steps with respect to each of the others, all as exemplified in the constructions herein set forth, and the scope of invention will be indicated in the claims.

BRIEF DESCRIPTION OF THE DRAWINGS

For a fuller understanding of the inventive embodiments, reference is had to the following description taken in connection with the accompanying drawings in which:

FIGS. 5 and 6 show detailed cutaway views of the faucet of the type depicted in the embodiment shown in FIG. 4;

FIG. 7 shows a cross-sectional view of a diverter valve, in accordance with various embodiments of the present invention;

FIG. 8 depicts a schematic diagram of a faucet-integrated carbonation system, in accordance with various embodiments of the present invention;

DETAILED DESCRIPTION OF THE PREFERRED EMBODIMENTS

Figure 1:
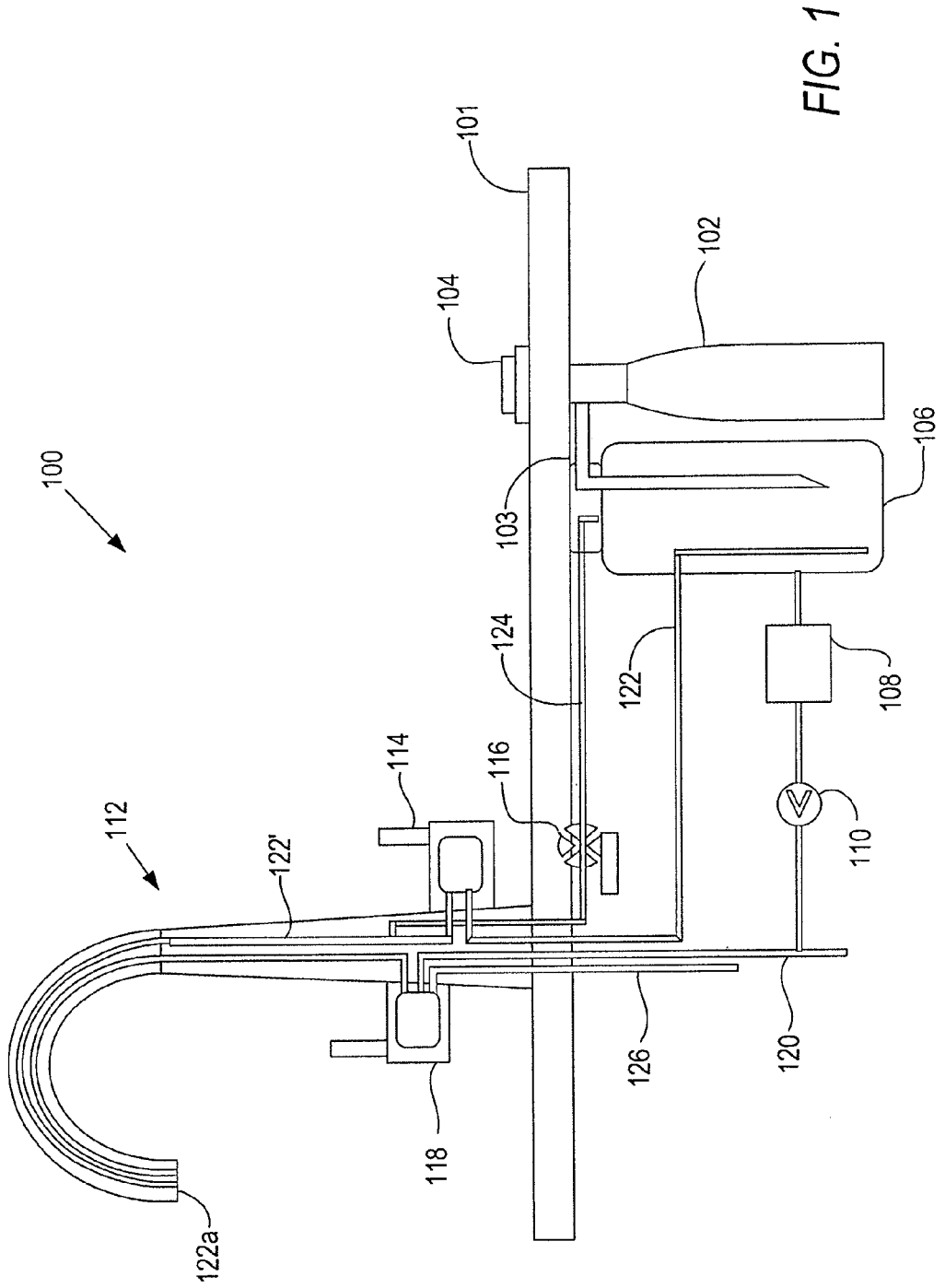
FIGS. 1-4 show schematic diagrams of faucet-integrated carbonation systems, in accordance with various embodiments of the present invention.

FIG. 1 depicts a schematic diagram of a faucet-integrated carbonation system 100 in accordance with various embodiments. Faucet 112 can include a cold water supply line 120 and a hot water supply line 126 fluidly coupled to a mixing valve 118. Mixing valve 118 may control the flow rate and temperature of non-carbonated water ejected from faucet 112 and may take the form of any suitable mixing valve known in the art. Carbonation system 100 can include $CO_2$ tank 102, which can be mounted below a countertop 101, and $CO_2$ activation mechanism 104, which may be mounted above the countertop with respect to the $CO_2$ tank. $CO_2$ activation mechanism 104 can be physically coupled to a valve on the top of $CO_2$ tank 102 through an opening in the countertop, such that activating $CO_2$ activation mechanism 104 can open $CO_2$ tank 102 and allow pressurized $CO_2$ gas to flow into a carbonated water reservoir 106. $CO_2$ tank 102 may be any suitable $CO_2$ tank that can be removably coupled to system 100 for easy replacement when the tank is spent. For example, the $CO_2$ tank can be a soda stream type tank, or it can be a regulated $CO_2$ tank (that is, a tank with a regulator and valve that can be mechanically operated to open and close the regulated flow of $CO_2$).

Carbonated water reservoir 106 can be connected to cold water supply line 120 through a pressure regulator 108 and a backflow check valve 110, the latter ensuring that water from carbonated water reservoir 106 cannot flow back into a cold water supply line 120. Carbonated water reservoir 106 may be formed from any suitable material, such as stainless steel, aluminum, a plastic, a composite, or combinations of materials, for example. In some embodiments, carbonated water reservoir 106 may be insulated. Cold water supply line 120 may be connected to a water supply. The reservoir can vary in size to accommodate space constraints and provide varying amounts of carbonated water supply between charging cycles. It is preferable that the reservoir hold at least about 500 ml of water to avoid constant need for refilling and recharging.

Carbonated water reservoir 106 can also be coupled to a waterway 122 for dispensing carbonated water to a faucet 112. Waterway 122 can travel from carbonated water reservoir 106 to a carbonated water on/off valve 114 mounted on faucet 112. On/off valve 114 may be a compression valve, a ball valve, a cartridge valve, a ceramic disk valve, or any other suitable valve for controlling the flow of water. If the pressure in the reservoir is below that of pressure regulator 108 and the carbonated water on/off valve 114 is moved to the "on" position, water can flow from cold water supply line 120, through backflow check valve 110 and pressure regulator 108, into carbonated water reservoir 106, up through carbonated water on/off valve 114 via waterway 122, and finally to an outlet 122a at the end or tip of faucet 112 via waterway 122' downstream of carbonated water on/off valve 114.

Carbonated water reservoir 106 can also be fitted with a pressure relief line 124 that can be disposed in an upper region of the reservoir. Pressure relief line 124 can flow into waterway 122' at a point downstream of carbonated water on/off valve 114. Gas or liquid may flow through pressure relief line 124 via a pressure relief valve 116 when the pressure in carbonated water reservoir 106 exceeds a predetermined threshold. As one example, the predetermined threshold may be about 45 psi, which is a typical pressure used for rapid dissolution of $CO_2$ into water, but higher pressures of about 100-135 psi can also be employed to allow for more rapid carbonation and increased levels of carbonation in the reservoir. Pressure relief valve 116 may be fitted with an alarm (e.g., a horn) that can generate an audible signal when the pressure exceeds the predetermined threshold and gas and/or liquid flows through pressure relief line 124 into waterway 122'. Pressure relief valve 116 may be allowed to vent into the space below countertop 101. However, directing its output to pressure relief line 124 may advantageously allow any liquid that exits the valve to be directed to the sink. It also can help to ensure that the user more readily receives a signal (visual or audible) that the pressure relief valve 116 has triggered. To produce and dispense carbonated water, a user can ensure that carbonated water on/off valve 114 is in the "off" position and then activate $CO_2$ activation mechanism 104, causing $CO_2$ gas to enter carbonated water reservoir 106 via $CO_2$ inlet 103, the outlet of which may be positioned below the liquid in the reservoir to agitate the liquid and speed dissolution of $CO_2$. In some embodiments, $CO_2$ activation mechanism 104 may be coupled to a button or valve of $CO_2$ tank 102 that can control the flow of $CO_2$ from the tank. The $CO_2$ can begin to dissolve in the water under the high-pressure conditions created inside the reservoir. According to some embodiments, the user can continue activating $CO_2$ activation mechanism 104 until an audible signal is received from pressure relief valve 116, which can indicate that a sufficient quantity of $CO_2$ has been injected into carbonated water reservoir 106 to reach the predetermined pressure threshold. For greater levels of carbonation, the user can depress the $CO_2$ activation mechanism 104 until additional (e.g., 1-4) audible signals (or visual signals, if gas/liquid is seen exiting the faucet outlet) are received. In other embodiments, the supply of $CO_2$ from $CO_2$ tank 102 can be cut off automatically when the predetermined pressure threshold is reached.

To dispense the carbonated water produced in carbonated water reservoir 106, carbonated water on/off valve 114 can be moved to the "on" position. The pressure prevailing in carbonated water reservoir 106 can cause the liquid to flow through waterway 122' and out of outlet 122a at the tip of faucet 112.

When the pressure in carbonated water reservoir falls below the pressure of pressure regulator 108 on cold water supply line 120 (e.g., about 20 psi), water can automatically begin to flow from cold water supply line 120 into carbonated water reservoir 106 to sustain the volume of liquid in the carbonated water reservoir and the flow of carbonated water from outlet 122a. In these embodiments, water can flow until the pressure prevailing in carbonated water reservoir 106 equals the pressure set by pressure regulator 108, thereby leaving an air gap between the liquid and the top of carbonated water reservoir 106. The volume of the air gap may be inversely related to the pressure set by pressure regulator 108.

The inlet to waterway 122 may be positioned near the bottom of the carbonated water reservoir 106 to ensure that a large quantity of carbonated water can be dispensed between refilling and recharging cycles. Further, a large differential in pressure setting between pressure relief valve 116 and pressure regulator 108 can help to ensure that the pressure of $CO_2$ above the carbonated water in the reservoir is sufficient to dispense the majority of the carbonated water through the faucet before the pressure in the reservoir can fall below that of pressure regulator 108, which would otherwise open the reservoir to flow of water from the supply line, diluting the carbonation level. In some embodiments, the pressure differential may exceed 50 psi.

If a large volume of carbonated water is dispensed between activations of $CO_2$ activation mechanism 104, the level of carbonation in the carbonated water can drop substantially due to dilution from the uncarbonated water supplied via cold water supply line 120. When this occurs, the user can close carbonated water on/off valve 114 and activate $CO_2$ activation mechanism 104 to recarbonate the water in carbonated water reservoir 106.

According to some embodiments, carbonated water reservoir 106 can be insulated and can include thermoelectric cooling elements for providing chilled carbonated water. The thermoelectric cooling elements can be activated separately from carbonated water on/off valve 114 and/or activation mechanism 104 such that a user can choose whether or not to cool the carbonated water dispensed from faucet 112. A user interface for adjusting the temperature of water in carbonated reservoir 106 may be provided that may include one or more temperature control elements (e.g., buttons, knobs, or dials) and one or more temperature output mechanisms (e.g., an electronic display or a mechanical or chemical temperature indicator).

According to some embodiments, a filter, reverse osmosis system, and/or UV purification system can be disposed upstream of carbonated water reservoir 106 (e.g., in line with cold water supply line 120) in order to provide filtered and/or purified carbonated water via faucet 112.

Figure 2:
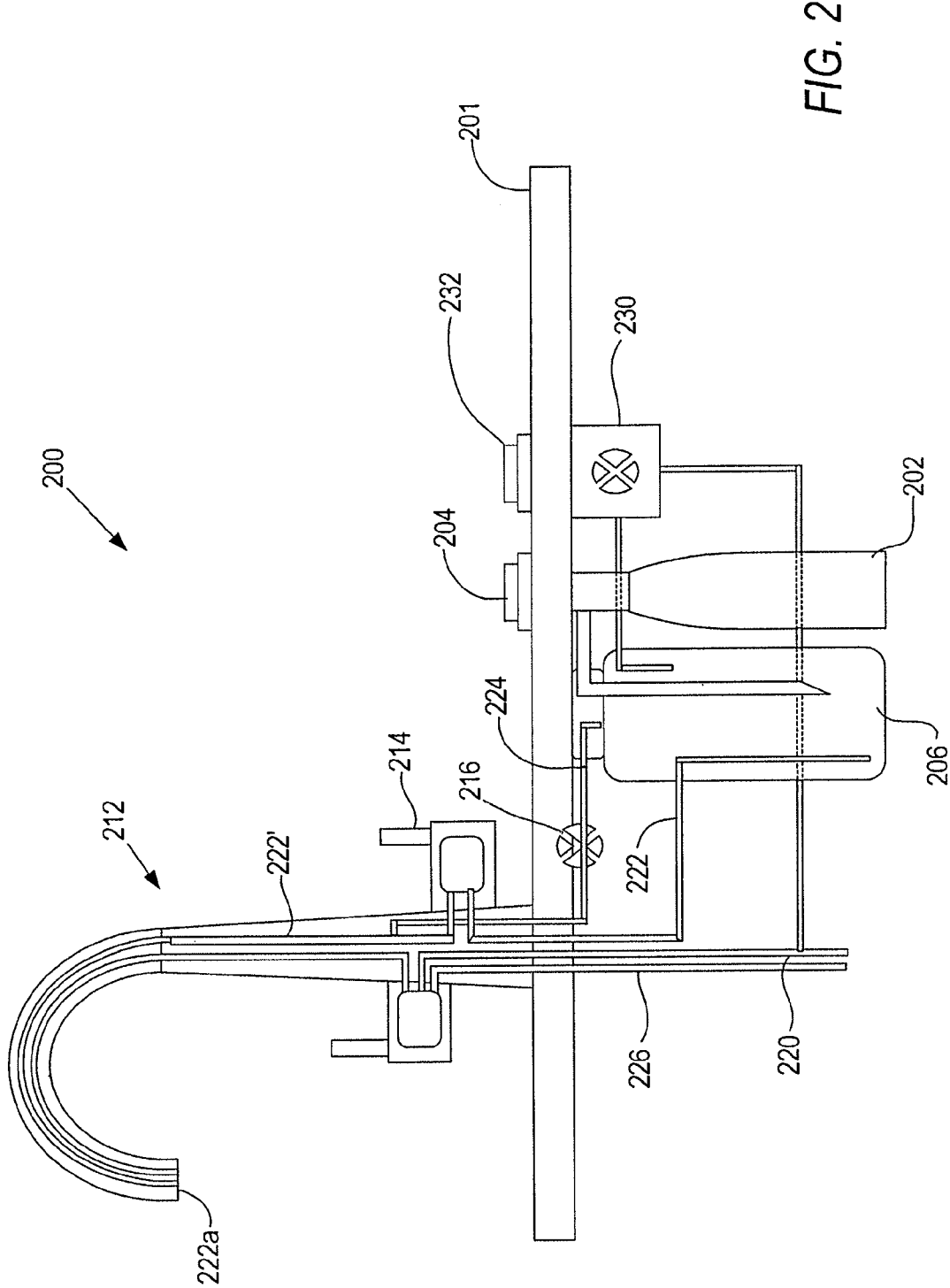

FIG. 2 depicts a schematic diagram of another faucet-integrated carbonation system 200, in accordance with various embodiments. Carbonation system 200 can be similar to the carbonation system 100 of FIG. 1 (with parts 1xx of FIG. 1 relabeled as 2xx) except system 200 may rely upon manual filling of carbonated water reservoir 206 via a metering valve 230 disposed inline between the reservoir and cold water supply line 220. Metering valve 230 can be mounted below countertop 201 such that fill a reservoir mechanism 232 extends through the countertop for above deck access. The timing of metering valve 230 can be selected to match the reservoir size so that the latter can be filled to its maximum level with a single activation of the metering valve.

To prepare and dispense carbonated water, a user can first ensure that carbonated water on/off valve 214 is in the "off" position and then activate fill reservoir mechanism 232 on metering valve 230, which can result in the flow of water from the cold water supply line 220 into carbonated water reservoir 206. Water can continue to flow, filling carbonated water reservoir 206 until metering valve 230 reaches a predetermined volume limit.

If the line pressure of cold water supply line 220 exceeds the pressure limit on pressure relief valve 216, it is possible that water will completely fill the carbonated water reservoir before metering valve 230 closes, in which case the pressure in the carbonated water reservoir 206 can exceed that of the pressure relief valve 216 and can allow water to flow into internal waterway 222' for dispensing carbonated water. In some conditions, such as when carbonated water reservoir 206 is largely full and metering valve 230 is activated, water may flow from carbonated water outlet 222a in the tip of the faucet 212. The inlet for pressure relief line 216 may be positioned a distance below the top of reservoir 206 that can ensure the presence of an air/$CO_2$ gap above the liquid in the reservoir. In some embodiments, the inlet may be positioned about 3 cm to 10 cm below the top of the reservoir.

After ensuring that the carbonated water reservoir is full, the user can activate $CO_2$ activation mechanism 204 as described above with respect to FIG. 1. The carbonated water can then be dispensed using the pressure of $CO_2$ gas above the liquid held in carbonated water reservoir 206. When the pressure of $CO_2$ drops and flow diminishes, the user can activate $CO_2$ activation mechanism 204 to restore desired flow and carbonation. Furthermore, when the liquid level in carbonated water reservoir 206 falls below a minimum level required for dispensing, $CO_2$ gas can escape via carbonated water outlet 222a, thereby signaling the user that it is time to reinitiate the filling and carbonating process.

Figure 3:
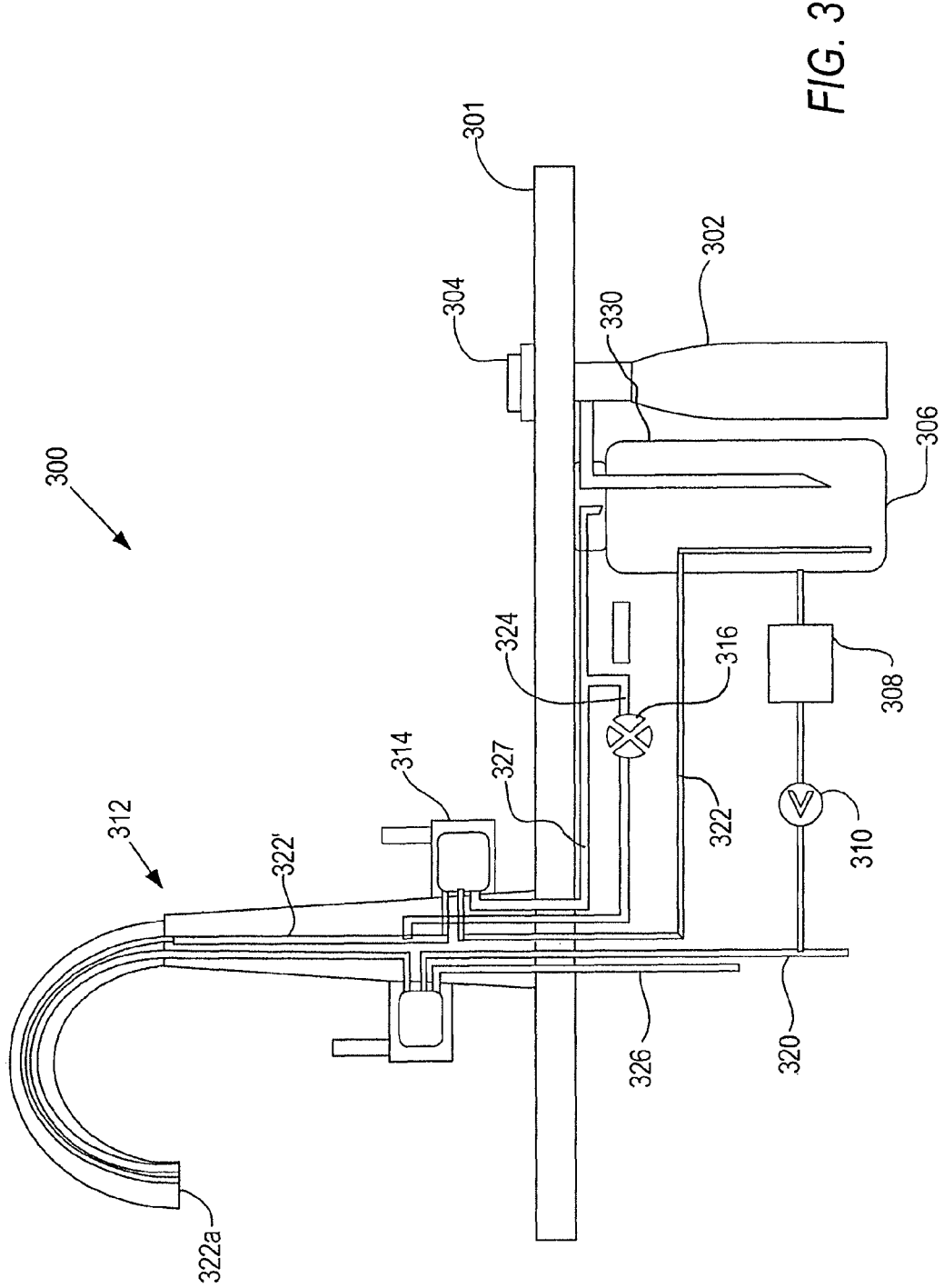

FIG. 3 depicts a schematic diagram of yet another faucet-integrated carbonation system 300, in accordance with various embodiments. Carbonation system 300 can be similar to carbonation system 100 of FIG. 1 (with parts 1xx of FIG. 1 relabeled as 3xx), with the addition of a fill vent line 327 connected to a multi-way valve 314 for dispensing carbonated water. Valve 314 can be used to refill carbonated water reservoir 306 when required.

According to some embodiments, when multi-way valve 314 is moved to a first position (e.g., of three positions), fill vent line 327 can be opened, and carbonated water line 322 can be closed, allowing the pressure in carbonated water reservoir 306 to drop close to atmospheric pressure. This arrangement can trigger pressure regulator 308, resulting in the flow of water from cold water supply line 320 into carbonated water reservoir 306. Because the end of fill vent line 327 can be located near the top of carbonated water reservoir 306, leaving valve 314 in the first position can result in the filling of carbonated water reservoir 306. That is, once the water level in carbonated water reservoir 306 reaches the end of fill vent line 327, water can begin to flow from carbonated water outlet 322a, signaling to the user that carbonated water reservoir 306 is full.

The user can move valve 314 to a second position, which can close fill vent line 327 and carbonated water line 322. While in the second position, the user can activate $CO_2$ activation mechanism 304 and carbonate the water in carbonated water reservoir 306.

Moving valve 314 to a third position can close fill vent line 327 and open carbonated water line 324, thereby dispensing carbonated water from the faucet 312.

Figure 4:
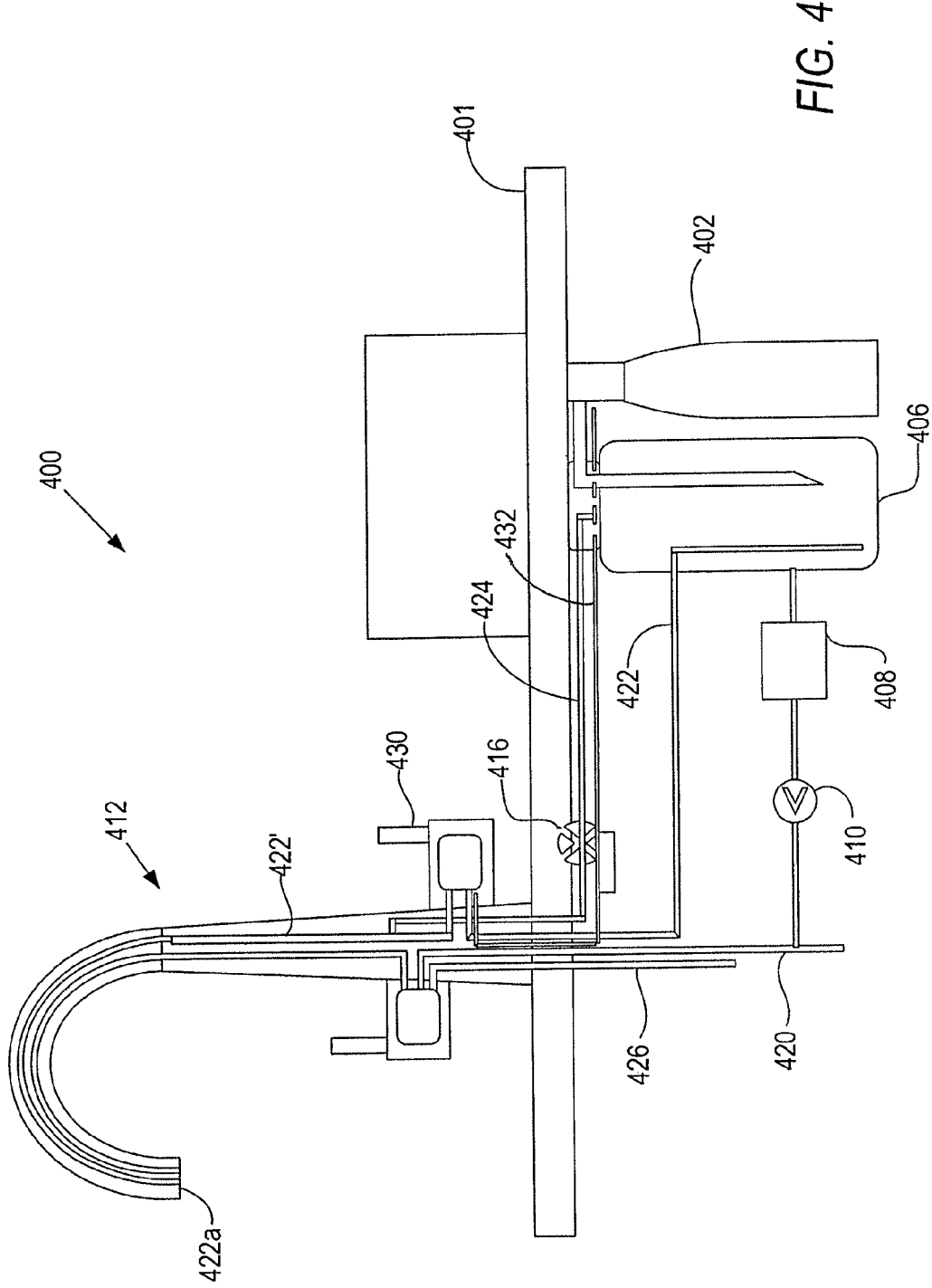

FIG. 4 depicts a schematic diagram of yet another faucet-integrated carbonation system 400, in accordance with various embodiments. Carbonation system 400 can be similar to carbonation system 100 of FIG. 1 (with parts 1xx of FIG. 1 relabeled as 4xx), with the exception that $CO_2$ activation mechanism 104 may be replaced with a $CO_2$ activation mechanism located on faucet 412. In particular, on/off valve 114 of FIG. 1 may be replaced with a multi-way diverter valve 430.

It should be appreciated that in systems like this and that of FIG. 1, the reservoir may only fill until the pressure inside equals that set by the inlet regulator (about 20 psi). This may cause the reservoir to only partially fill. 1 atmosphere of pressure is about 14.7 psi, so, the bottle may fill roughly half way at about 15 psi, ¾ at about 30 psi, ⅞ at about 45 psi, etc. Preferably, sizing of the reservoir and air/$CO_2$ gap should take this into account.

Diverter valve 430 may be mounted (e.g., rotatably) to faucet 412, and fluidly coupled to waterways 422 and 422'. In a first, off position, diverter valve 430 may disconnect waterway 422 from waterway 422' to prevent carbonated water from being ejected from carbonated water outlet 422a. In a second, "on" position, diverter valve 430 may provide a fluid connection between waterways 422 and 422' to permit carbonated water to flow from carbonated water reservoir 406 to carbonated water outlet 422a. These two positions of diverter valve 430 can operate in essentially the same manner as on/off valve 114 of FIG. 1.

In some embodiments, pressure relief line 424 may be fluidly coupled to waterway 422' via diverter valve 430 rather than being directly coupled to waterway 422' as depicted in FIG. 4. In these embodiments, diverter valve 430 may decouple pressure relief line 424 from waterway 422' in or more of the available positions (e.g., in the "on" position). However, it should be understood that pressure relief line 424 may have a fluidly open connection to waterway 422' in all available positions of diverter valve 430.

In a third position, diverter valve 430 may be configured to open $CO_2$ tank 402 and allow pressurized $CO_2$ gas to flow into carbonated water reservoir 406. For this purpose, cable 432, which may be a string, wire, multi-stranded cable, or any other long and flexible member suitable for the purpose, may be coupled between diverter valve 430 and a $CO_2$ tank valve connection, embodiments of which will be described in detail below with respect to FIGS. 11, 12A, and 12B. In some embodiments, cable 432 may be routed in a semi-rigid sheath. Moving diverter valve 430 to the third position may increase tension on cable 432 causing a $CO_2$ tank in fluid communication with the $CO_2$ tank valve connection to open, thereby permitting $CO_2$ gas to flow from $CO_2$ tank 402 into carbonated water reservoir 406. Operation of system 400 may otherwise proceed as described above with respect to FIG. 1.

Figure 5:
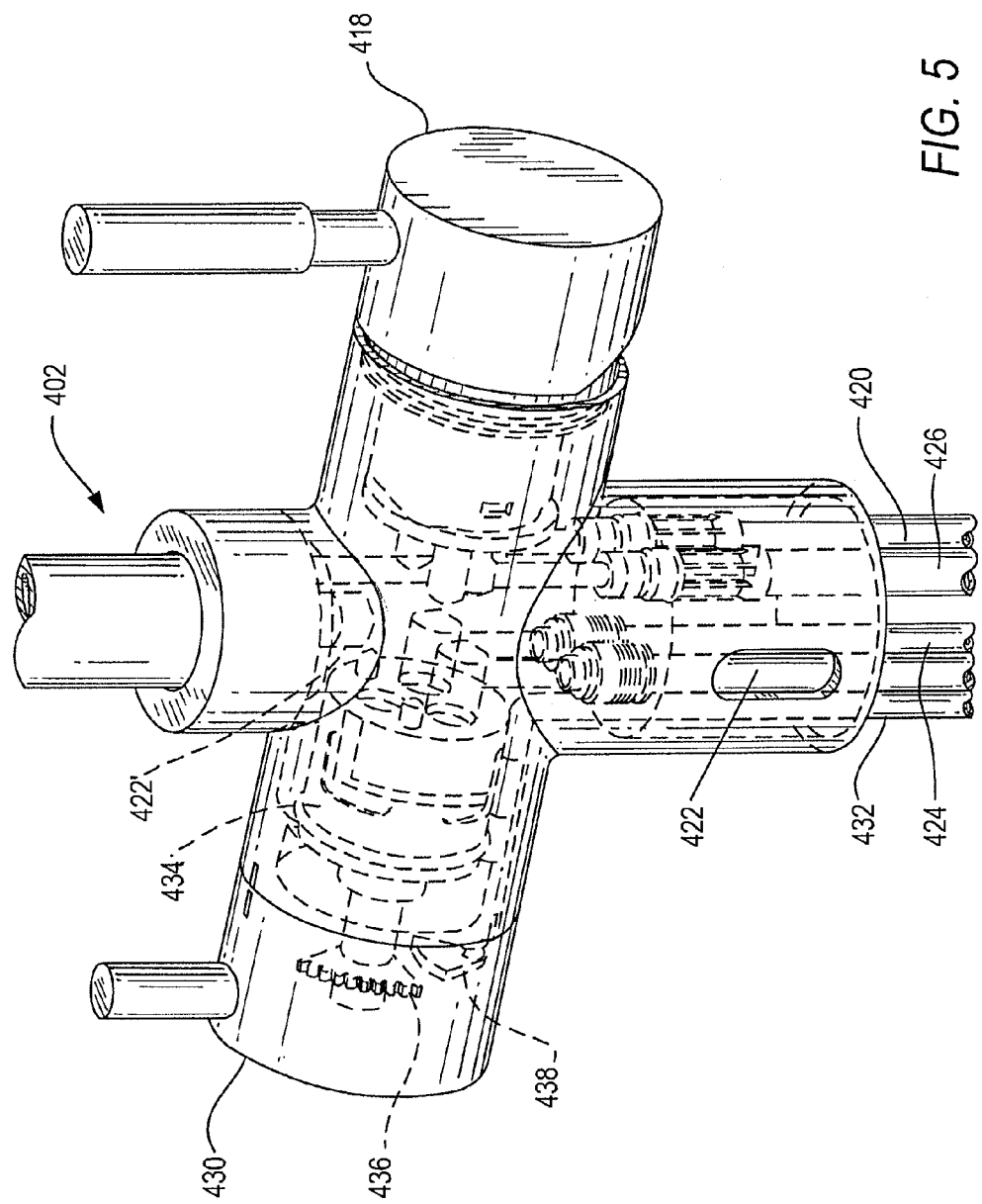

FIG. 5 shows a detailed cutaway view of faucet 412 of FIG. 4, in accordance with various embodiments. Faucet 412 can include cold water supply line 420 and a hot water supply line 426 fluidly coupled to a mixing valve 418. Mixing valve 418 may control the flow rate and temperature of non-carbonated water ejected from faucet 412 and may take the form of any suitable mixing valve known in the art.

Diverter valve 430 may be fluidly coupled to waterway 422, waterway 422', and pressure relief line 424 as described above. Switching between the three positions of diverter valve 430 may be accomplished using diverter 434, which may be housed inside diverter valve 430. Diverter 434 may rotate with the external housing of diverter valve 430 in order to connect or disconnect the various waterways and pressure relief lines. In particular, turning diverter valve 430 to the "on" position may result in an internal chamber of diverter 434 opening to form a fluid connection between waterway 422 and waterway 422; while turning diverter valve 430 to the "off" position may result in the internal chamber of diverter 434 closing to block a connection between waterway 422 and waterway 422'. In some embodiments, an O-ring or the like may be provided around a circumference of diverter 434 to seal diverter valve 430 from the internal volume of faucet 412.

A diverter fan gear 436 may be coupled to diverter 434 in a rotatably fixed manner such that the diverter fan gear rotates about a longitudinal axis of the diverter when diverter valve 430 is rotated. Diverter fan gear 436 may be sector-shaped and may be provided with teeth 436a formed on its arc end in some embodiments. When diverter valve 430 is rotated towards the third position (i.e., the $CO_2$ tank fill position), diverter fan gear 436 may interact with a cable fan gear 438. In some embodiments, teeth 436a may interact with complementary teeth 438a of cable fan gear 438. The interaction may result in cable fan gear 438 rotating about a longitudinal axis substantially parallel to that of diverter 434.

Cable fan gear 438 may be physically coupled to one end of a threaded member using a suitable fastening method, such as a clip, a press fit, an adhesive, and combinations of the above, for example. The other end of the threaded member may be physically coupled to cable 432 using, for example, a crimped connection. Upon interaction between diverter fan gear 436 and cable fan gear 438 when diverter valve 430 is turned toward the third position, the threaded member may rotate in a threaded bore, causing tension to increase on cable 432. This increased tension may be translated down the length of cable 432 thereby causing the $CO_2$ tank valve connection to open and allowing $CO_2$ to flow into carbonated water reservoir 406. When the pressure prevailing inside carbonated water reservoir 406 reaches its maximum value (as defined by pressure relief valve 416), excess pressure may be vented via pressure relief line 424, diverter valve 430, and waterway 422 and/or 422'.

FIG. 6 shows another detailed cutaway view of faucet 412 of FIG. 4, in accordance with various embodiments. In particular, FIG. 6 illustrates how fan gears 436 and 438 are poised to interact upon rotation of diverter valve 430. When diverter valve 430 is rotated clockwise towards its third position, labeled '$CO_2$,' diverter fan gear 436 may interact with cable fan gear 438 thereby increasing the tension on cable 432.

FIG. 7 shows a cross-sectional view of diverter valve 430, in accordance with some embodiments. In particular, FIG. 7 depicts cable fan threaded member 440 coupled to cable fan gear 438 and cable 432 and threadably engaged inside threaded bore 442.

FIG. 8 depicts a schematic diagram of yet another faucet-integrated carbonation system 500, in accordance with various embodiments. Carbonation system 500 can be similar to carbonation system 300 of FIG. 3 (with parts 3xx of FIG. 1 relabeled as 5xx), with the exception that $CO_2$ activation mechanism 104 may be replaced with a $CO_2$ activation mechanism located on faucet 512. In particular, on/off valve 314 of FIG. 3 may be replaced with multi-way diverter valve 530.

Diverter valve 530 may be mounted (e.g., rotatably) to faucet 512, and fluidly coupled to waterways 522 and 522'. Three positions of diverter valve 530 may operate in essentially the same manner as diverter valve 430 of FIG. 4. That is, diverter valve 530 may have an "off" position in which waterway 522 is disconnected from waterway 522', an "on" position in which waterway 522 is fluidly coupled to waterway 522', and a $CO_2$ fill position in which $CO_2$ tank 502 is opened, permitting $CO_2$ to flow into carbonated water reservoir 506.

In a fourth position, diverter valve 530 may be configured to fill carbonated water reservoir with water from cold water supply line 520. Accordingly, fill vent line 527 may be fluidly coupled to diverter valve 530. In the fourth position, diverter valve 530 can vent fill vent line 527 to the atmosphere (e.g., via waterway 522'), thereby reducing the pressure in carbonated water reservoir 506. When the pressure in carbonated water reservoir 506 drops below the pressure of pressure regulator 508, water may begin to flow from cold water supply line 520 into carbonated water reservoir 506. When carbonated water reservoir 506 is full, water may flow through fill vent line 527, through diverter valve 530, up waterway 522', and out of outlet 522a at the end of faucet 512.

Figure 9B:
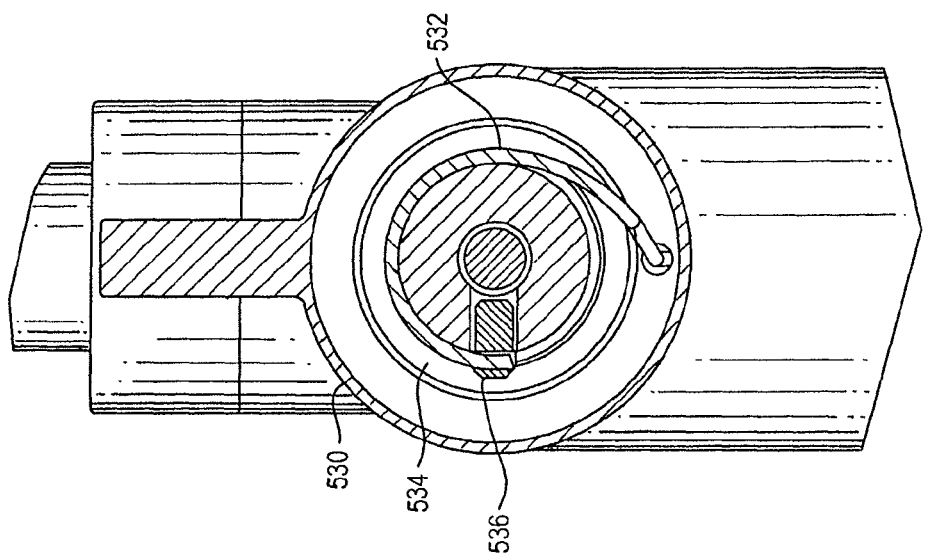
FIG. 9B shows a cross-sectional view of a diverter valve of the type depicted in the embodiment shown in FIG. 8.
Figure 9A:
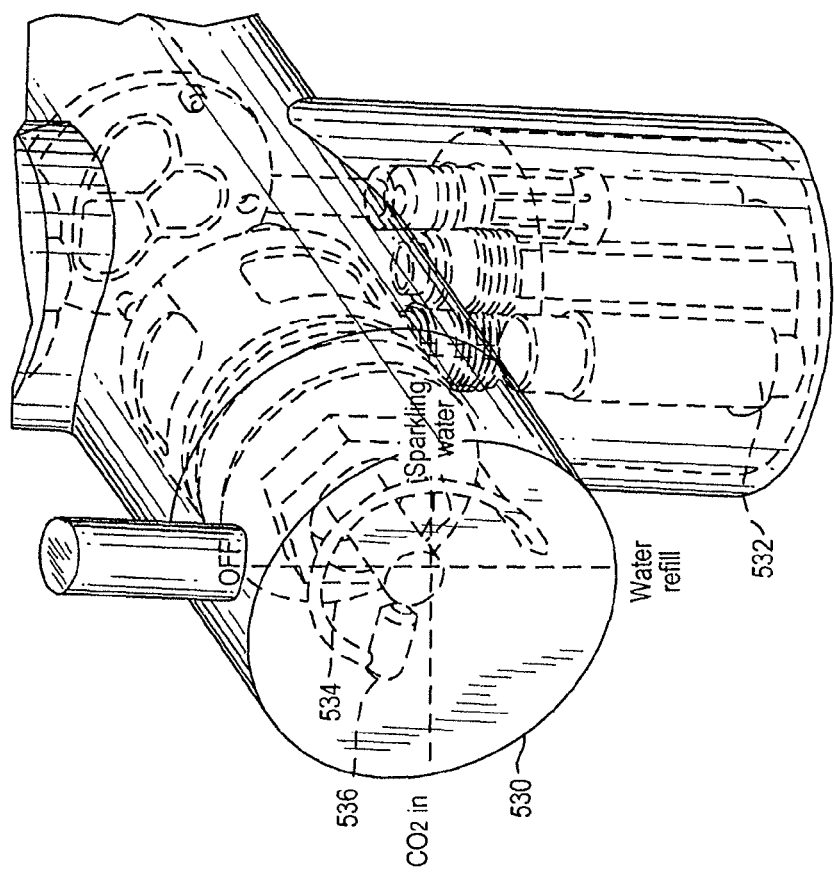
FIG. 9A shows a cutaway view of a faucet of the type depicted in the embodiment shown in FIG. 8.

FIG. 9A shows a cutaway view of faucet 512 of FIG. 8, in accordance with various embodiments. Reference is also made to FIG. 9B, which shows a cross-sectional view of diverter valve 530, in accordance with various embodiments. Faucet 512 can include cold water supply line 520 and hot water supply line 526 fluidly coupled to mixing valve 518. Mixing valve 518 may control the flow rate and temperature of non-carbonated water ejected from faucet 512 and may take the form of any suitable mixing valve known in the art.

Diverter valve 530 may be fluidly coupled to waterway 522, waterway 522', and pressure relief line 524 as described above. Switching between the four positions of diverter valve 530 may be accomplished using diverter 534, which may be housed inside diverter valve 530. Diverter 534 may rotate with the external housing of diverter valve 530 in order to connect or disconnect the various waterways and pressure relief lines. In particular, turning diverter valve 530 to the "on" position may result in an internal chamber of diverter 534 opening to form a fluid connection between waterway 522 and waterway 522'; while turning diverter valve 530 to the "off" position may result in the internal chamber of diverter 534 closing to block a connection between waterway 522 and waterway 522'. Turning diverter valve 530 may result in an internal chamber of diverter 534 opening to form a fluid connection between fill vent line 527 and waterway 522' in order to fill carbonated water tank 506 in the manner described above. In some embodiments, an O-ring or the like may be provided around a circumference of diverter 534 to seal diverter valve 530 from the internal volume of faucet 512.

A cable engagement flange 536 may extend substantially perpendicularly from a distal portion of diverter 534, opposite the end of diverter 534 where the fluid connections to the waterways are made. Cable 532 (which, in some embodiments, may be routed in a semi-rigid sheath) may be threaded into the housing of diverter valve 530, routed around the distal portion, and coupled to cable engagement flange 536. Thus, when diverter valve 530 is turned to the $CO_2$ fill position, tension on cable 532 may increase, thereby causing $CO_2$ tank 502 to open in order to inject $CO_2$ into carbonated water reservoir 506. A connection between cable 532 and cable engagement portion 536 may be made using one or more clips, fasteners, or clamps, an adhesive, a press fit, or combinations thereof.

Unlike the embodiments of diverter valve 430 disclosed above, diverter valve 530 might not require a threaded connection between the cable and the diverter. It should be recognized, however, that the threaded connection embodiments may be practiced with diverter valve 530, and that the routed cable embodiments may be practiced with diverter valve 430.

Figures 10A, 10B:
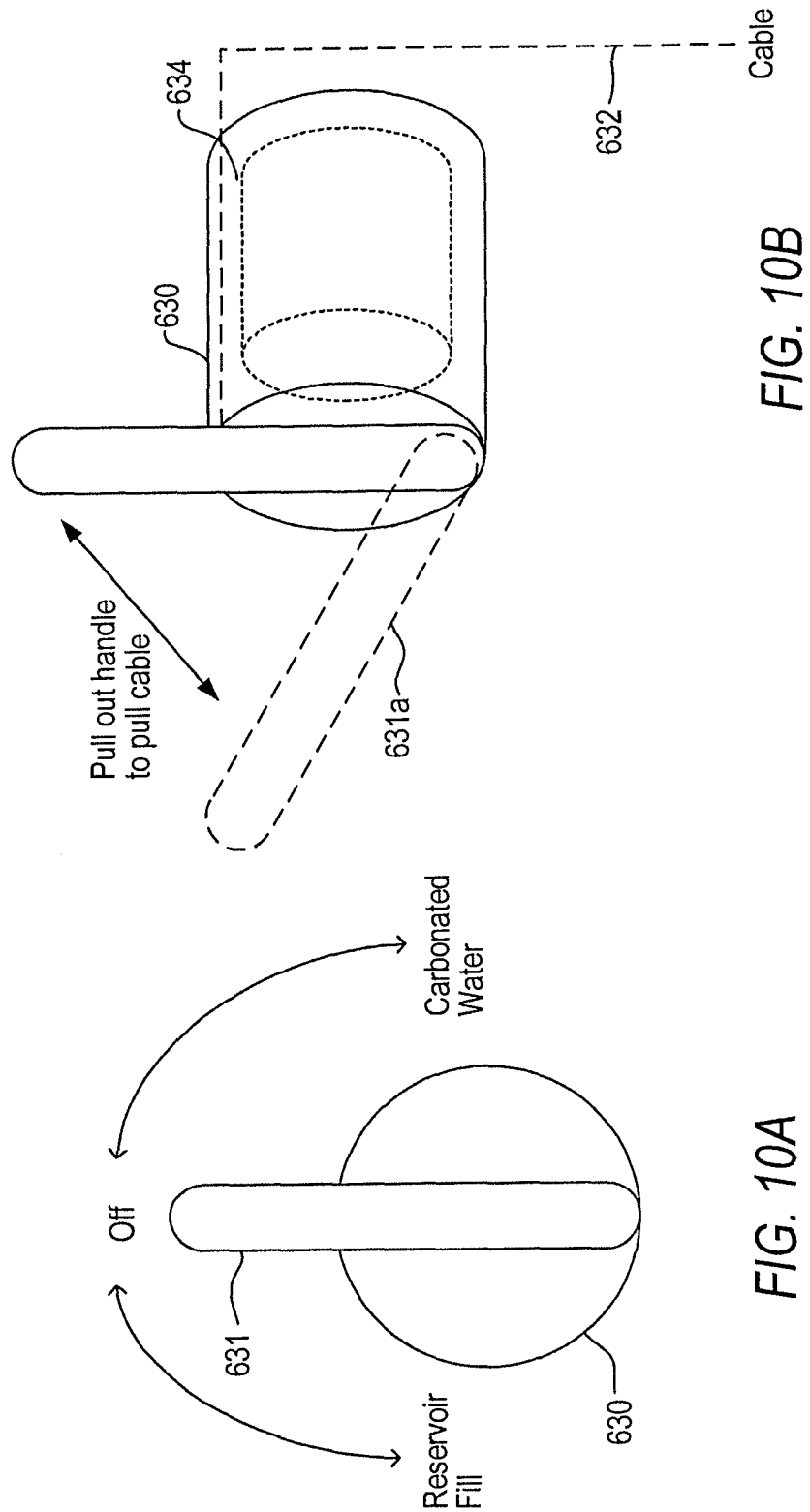
FIGS. 10A-10C show schematic views of a diverter valve, in accordance with various embodiments of the present invention.
Figure 10C:
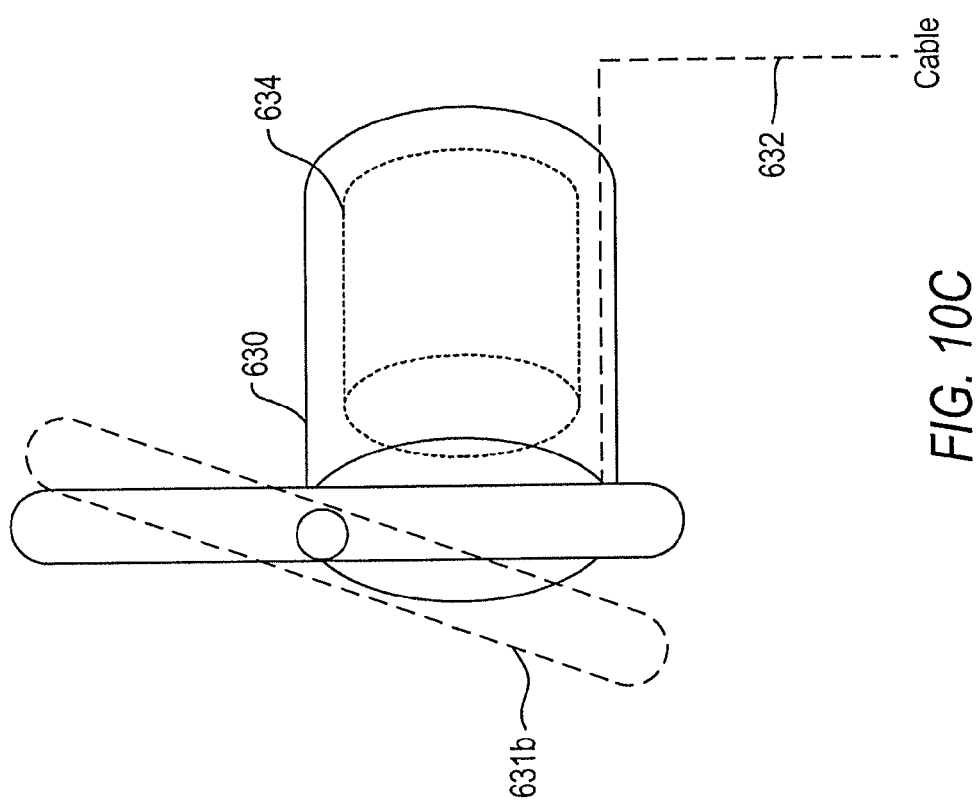

FIGS. 10A-10C show schematic views of diverter valve 630, in accordance with some embodiments. Diverter valve 630 may be similar to diverter valve 530 with the exception that handle 631, which may be hingedly coupled to the body of diverter valve 630, may be pulled away from the body to open the valve of a $CO_2$ tank (e.g., $CO_2$ tank 502), permitting $CO_2$ to flow into a carbonated water reservoir (e.g., carbonated water reservoir 506). Advantageously, the rotation of the diverter valve is decoupled from activation of the cable.

Cable 632 (which, in some embodiments, may be routed in a semi-rigid sheath) may be routed through diverter valve 630 and attached to an inside wall of an outer shell of valve handle 631, such that when valve handle 631 is pulled away, cable 632 is tensioned. It should be understood that the pull-away handle of FIGS. 10A-10C may be part of another type of multi-way diverter valve such as diverter valve 430, for example.

In the embodiment shown in FIG. 10B, valve handle 631a, which may be hingedly attached to a bottom portion of the body of diverter valve 630, may be rotated one direction to dispense carbonated water, rotated in an opposite direction to fill the carbonated water reservoir, and pulled outward from the top to tension cable 632 and carbonate the water in the carbonated water reservoir. In the embodiment shown in FIG. 10C, valve handle 631b, which may be hingedly attached to a top portion of the body of diverter valve 630, may be pulled outward from the bottom to tension cable 632. Pulling valve handle 631b from the bottom may permit diverter valve 630 to be constructed in a particularly simple manner, wherein cable 632 avoids the various waterways fluidly coupled to diverter valve 630.

In some embodiments, valve handle 631 may be keyed so that it can only be pulled out from upright position when all openings to the reservoir are closed.

Figure 11:
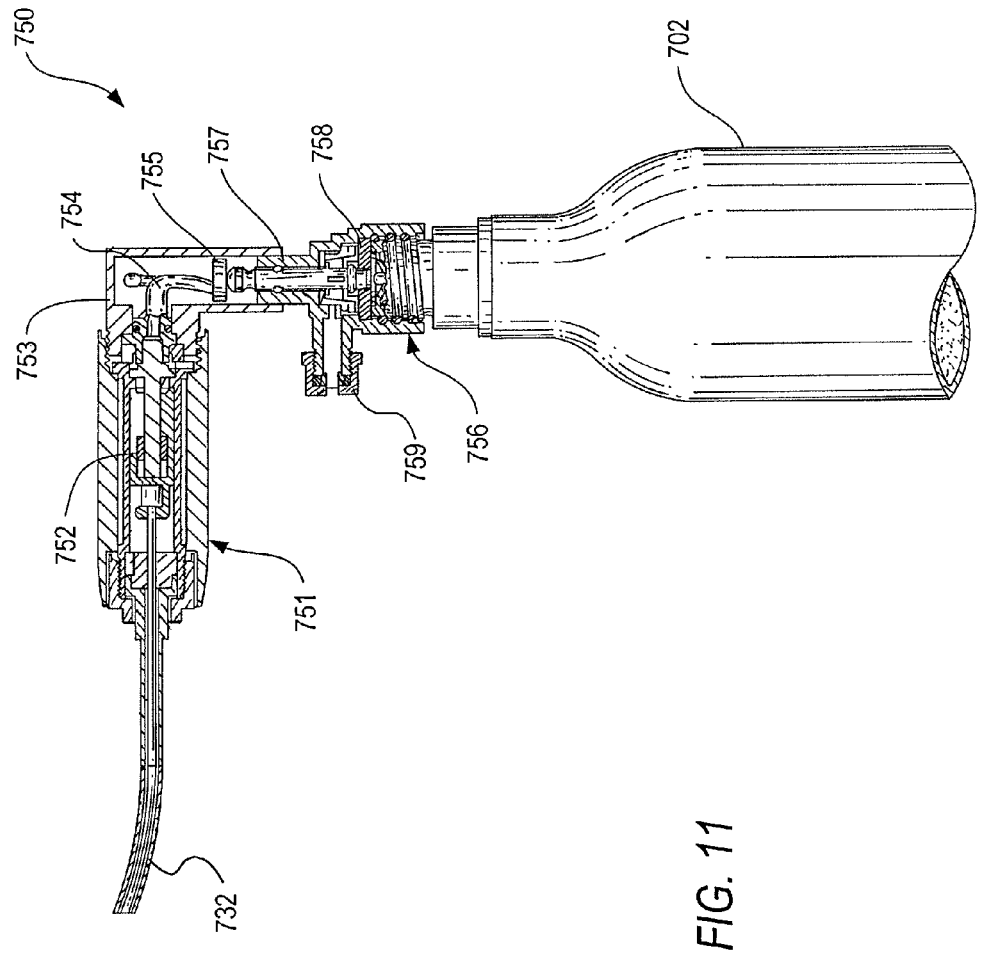
FIG. 11 shows a cross-sectional view of a $CO_2$ tank and an activation valve assembly, in accordance with various embodiments of the present invention.

FIG. 11 shows a cross-sectional view of $CO_2$ tank 702 and an activation valve assembly 750, in accordance with some embodiments. Activation valve assembly 750 may be used in conjunction with a cable-driven $CO_2$ activation system, such as systems 400 and 500 disclosed above, for example. Activation valve assembly 750 may include a cable coupling portion 751, a coupling elbow 753, and a $CO_2$ tank-coupling portion 756. The components of activation valve assembly 750 may be formed from a metal (e.g., aluminum or stainless steel), a plastic, a composite, or combinations thereof.

Cable coupling portion 751 may be physically coupled to one end of cable 732, which may be attached at its other end to a diverter valve (e.g., diverter valve 430 or 530). Cable coupling portion 751 may be a hollow cylinder-shaped member with a threaded end for threadably engaging complementary threads of coupling elbow 753. Plunger 752 may be coupled to the end of cable 732 (which, in some embodiments, may be routed in a semi-rigid sheath) such that increased tension placed on cable 732 can longitudinally displace plunger 752 inside cable coupling portion 751. A restoring element (e.g., a spring) may force plunger 752 toward coupling elbow 753 to maintain activation valve assembly 750 in a normally closed position.

Coupling elbow 753 may include cam 754 and a stopper 755, which may be longitudinally displaceable within coupling elbow 753. Cam 754 can be sealed on a first end by plunger 752 and can have physical contact with stopper 755 on a second end. Upon displacement of plunger 752, stopper 755 may be longitudinally displaced by the rotary displacement provided by cam 754.

On its other end, coupling elbow 753 may be connected to $CO_2$ tank coupling portion 756, which may be threadably coupled to $CO_2$ tank 702. $CO_2$ tank coupling portion 756 may include a valve finger 757, a valve 758, and a $CO_2$ outlet 759 for controlling flow of $CO_2$ from $CO_2$ tank 702. It should be understood that the $CO_2$ tank valve is self-closed by the pressure inside the $CO_2$ tank, and that when stopper 755 is displaced, valve finger 757 may remain in the same position. Upon displacement (downward) of valve finger 757, valve 758 may open, placing $CO_2$ tank 702 in fluid communication with $CO_2$ tank outlet 759, thereby allowing $CO_2$ to flow from the tank into carbonated water reservoir 706.

Figure 12:
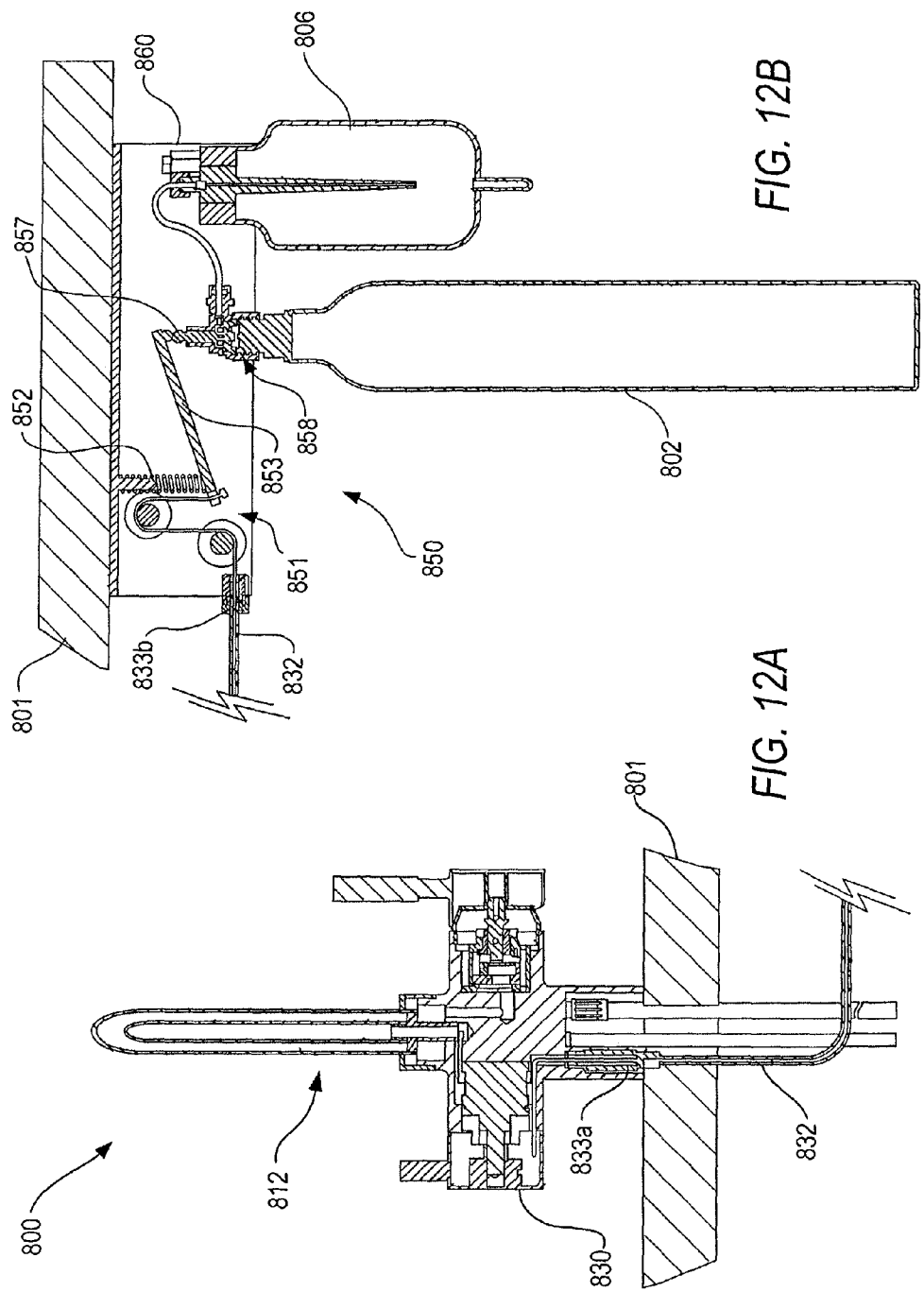
FIGS. 12A and 12B show cross-sectional views of a faucet-integrated carbonation system, in accordance with various embodiments of the present invention.

FIGS. 12A and 12B show cross-sectional views of faucet-integrated carbonation system 800, in accordance with some embodiments. System 800 may include $CO_2$ tank 802, carbonated water reservoir 806, and activation valve assembly 850, in accordance with some embodiments. Like activation valve assembly 750 of FIG. 11, activation valve assembly 850 may be a cable-driven valve assembly for controlling the flow of $CO_2$ from $CO_2$ tank 802 into carbonated water reservoir 806.

Cable 832, which, in some embodiments, may be routed in a semi-rigid sheath, and which may run from a diverter valve (e.g., diverter valve 430 or 530), may be routed around one or more pulleys 851 of activation valve assembly 850 and coupled to a first end of a lever 852. Pulleys 851 can alter the direction that cable 832 runs in activation valve assembly 850 such that tension on cable 832 may act to move lever 853 in a substantially parallel direction to a restoring force provided by spring 852. The force on the end of lever 853 provided by cable 832 may overcome the restoring force provided by spring 852 in order to rotate lever 853 about a fulcrum. Rotation of lever 853 in this manner may transfer a force onto valve finger 857 of $CO_2$ tank coupling portion 856, which may cause valve 858 to open. When valve 858 is opened, $CO_2$ may flow from $CO_2$ tank 802 into carbonated water reservoir 806.

$CO_2$ tank 802, carbonated water reservoir 806, and various components of activation valve assembly 850 may be mounted to countertop 801 using mounting bracket 860 as disclosed in more detail below with respect to FIG. 13.

According to some embodiments, cable 832 may be routed through cable sleeves, which may ensure that the pulling force is directed as desired and prevent tangling of cable 832 and/or excessive friction between cable 832 and various components of system 800. In particular, a first cable sleeve 833a may be coupled to faucet 812 and/or countertop 801, and a second cable sleeve 833b may be coupled to mounting bracket 860. Cable sleeves 833a and 833b may be coupled to system 800 in any suitable manner, such as using threaded couplings, press fits, or adhesives, for example.

Figure 13:
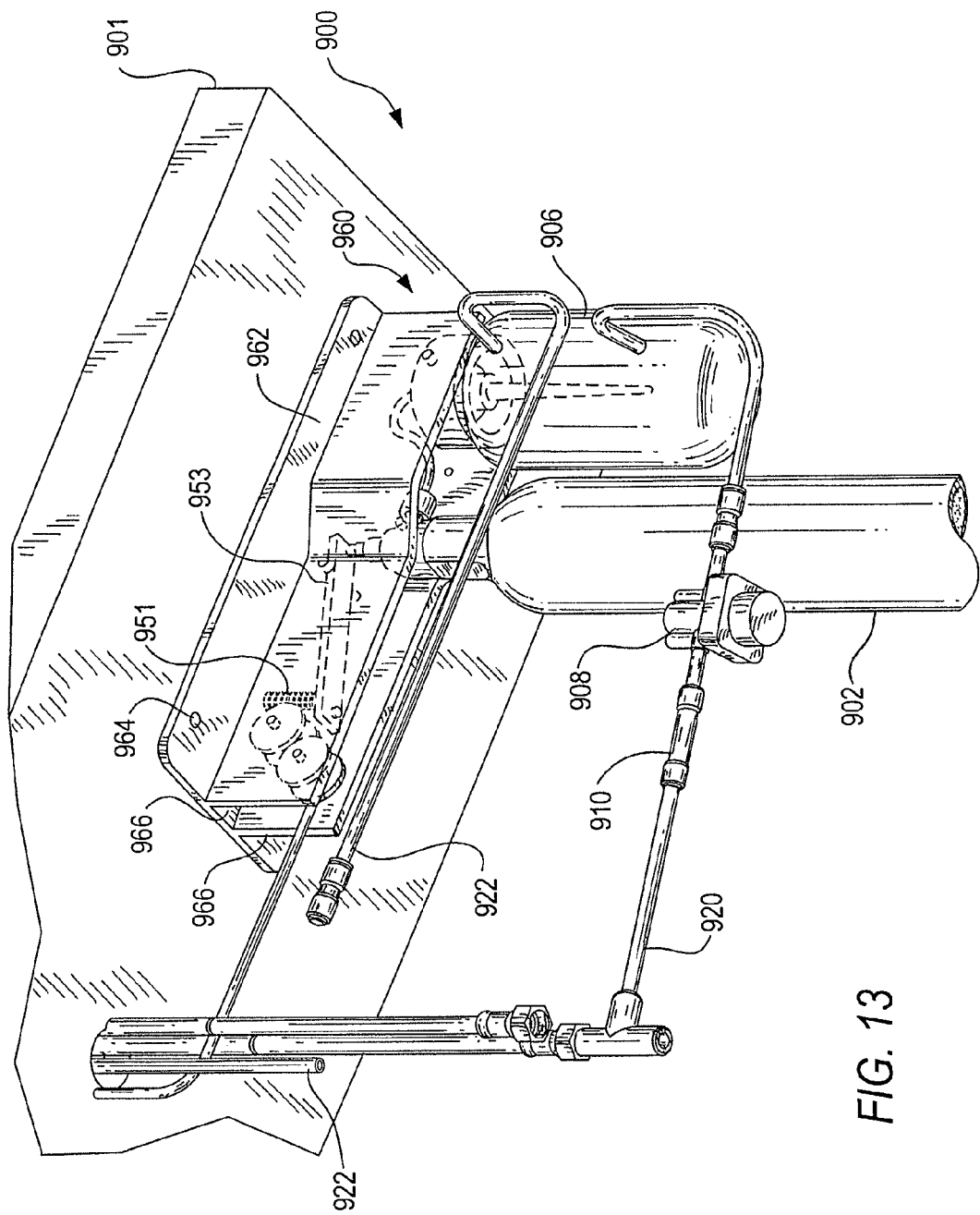
FIG. 13 shows a perspective view of a faucet-integrated carbonation system, in accordance with various embodiments of the present invention.

FIG. 13 shows a perspective view of faucet-integrated carbonation system 900, in accordance with some embodiments. It should be understood that FIG. 13 illustrates how various faucet-integrated carbonations systems disclosed herein may be mounted beneath a countertop. Therefore, while specific system components are depicted in FIG. 13, mounting bracket 960 may be used to secure components of any of the disclosed embodiments to countertop 901.

Mounting bracket 960 may include a base plate 962, which may be coupled to countertop 801 using one or more fasteners 964 and/or an adhesive. Fasteners 964 may be chosen as appropriate for the material composing countertop 901 as known in the art. Mounting bracket 960 may also include substantially parallel plates 966, extending substantially perpendicularly away from base plate 962 and countertop 901. The various components of system 900 may be coupled directly to parallel plates 966 such that the components can be suspended off the floor of a cabinet supporting countertop 901.

Accordingly, one or more of the axes for pulleys 951, the fulcrum for lever 953, $CO_2$ tank 902, and carbonated water reservoir 906, may be coupled to one or more of parallel plates 966. It should be understood, however, that in other embodiments, one or more of the components of system 900 may be placed on the floor of the cabinet or other structure supporting countertop 901. These embodiments can advantageously obviate the need for expensive mounting hardware.

Although the disclosed embodiments can operate mechanically, without the use of electricity, embodiments of the present invention can be implemented in the form of control logic in software or hardware or a combination of both. For example, particular embodiments can be implemented by using application specific integrated circuits or programmed logic circuits. In general, the functions of particular embodiments can be achieved by any suitable means as is known in the art. Communication or transfer of data or instructions may be wired, wireless, or by any other suitable means. Also, elements of the inventive embodiments can be enabled or disabled as is useful in accordance with a particular application.

Furthermore, it should be understood that the aspects, features and advantages made apparent from the foregoing are efficiently attained and, since certain changes may be made in the disclosed inventive embodiments without departing from the spirit and scope of the invention, it is intended that all matter contained herein shall be interpreted as illustrative and not in a limiting sense.

It is also to be understood that the following claims are intended to cover all of the generic and specific features of the invention herein described, and all statements of the scope of the invention that, as a matter of language, might be said to fall there between.

What is claimed is:

1. A faucet for dispensing carbonated water, comprising:
a mixing valve coupled to a body of the faucet and fluidly coupled to at least one water supply line;
a carbonated water valve coupled to the body of the faucet and fluidly coupled to a carbonated water waterway, the carbonated water valve comprising at least a portion of a carbon dioxide activation mechanism; and
a dispensing waterway fluidly coupled to the carbonated water valve and configured to dispense carbonated water at an outlet of the faucet.

2. The faucet of claim 1, wherein the carbonated water valve is an ON/OFF valve comprising:
an ON position in which the carbonated water waterway is fluidly coupled to the dispensing waterway;
an OFF position in which the carbonated water waterway is disconnected from the dispensing waterway; and
a carbon dioxide charge position in which tension on a cable coupled to the carbonated water valve opens a carbon dioxide tank valve.

3. The faucet of claim 1, further comprising:
a pressure relief line fluidly coupled to the dispensing waterway at a point downstream of the carbonated water valve; and
a pressure relief valve fluidly coupled to the pressure relief line, wherein the pressure relief valve is configured to permit one of liquid and gas to flow towards the dispensing waterway when a prevailing pressure upstream of the pressure relief valve exceeds a threshold pressure.

4. The faucet of claim 3, further comprising a fill vent line fluidly coupled at a first end to the pressure relief line and at a second end to the carbonated water valve.

5. The faucet of claim 4, wherein the carbonated water valve is a multi-way diverter valve comprising:
an ON position in which the carbonated water waterway is fluidly coupled to the dispensing waterway;
an OFF position in which the carbonated water waterway is disconnected from the dispensing waterway;
a fill position in which the fill vent line is vented to the atmosphere via the dispensing waterway; and
a carbon dioxide charge position in which tension on a cable coupled to the carbonated water valve opens a carbon dioxide tank valve.

6. The faucet of claim 1, further comprising:
a water-dispensing waterway fluidly coupled to the mixing valve configured to dispense water at the outlet of the faucet.

7. A faucet-integrated carbonation system, comprising:
a faucet comprising:
a carbonated water valve fluidly coupled between a carbonated water waterway and a dispensing waterway, the dispensing waterway being configured to dispense carbonated water at an outlet of the faucet; and
a mixing valve fluidly coupled to a first branch of a water supply line;
a carbonated water reservoir fluidly coupled to:
a second branch of the water supply line; and
the carbonated water valve via the carbonated water waterway; and
a carbon dioxide tank fluidly coupled to the carbonated water reservoir via a carbon dioxide intake tube.

8. The faucet-integrated carbonation system of claim 7, further comprising:
a carbon dioxide activation mechanism coupled to a valve on the carbon dioxide tank and activatable to open the valve such that carbon dioxide gas flows into the carbonated water reservoir.

9. The faucet-integrated carbonation system of claim 7, further comprising:
a pressure regulator on the second branch of the water supply line, wherein the pressure regulator is configured to permit water to flow from the second branch of the water supply line into the carbonated water reservoir when a pressure prevailing in the carbonated reservoir is less than a threshold pressure value.

10. The faucet-integrated carbonation system of claim 9, further comprising:
a check valve disposed on the second branch of the water supply line upstream of the pressure regulator.

11. The faucet-integrated carbonation system of claim 7, further comprising:
a metering valve on the second branch of the water supply line; and
a fill reservoir mechanism coupled to the metering valve and activatable to open the metering valve such that water flows from the second branch of the water supply line into the carbonated water reservoir.

12. The faucet-integrated carbonation system of claim 7, further comprising a pressure relief line fluidly coupled at a first end to an upper section of the carbonated water reservoir and at a second end to the dispensing waterway.

13. The faucet-integrated carbonation system of claim 12, further comprising a pressure relief valve on the pressure relief line, wherein the pressure relief valve is configured to vent the carbonated water reservoir via the pressure relief line when a pressure prevailing in the carbonated water reservoir exceeds a threshold pressure.

14. The faucet-integrated carbonation system of claim 13, further comprising a fill vent line fluidly coupled at a first end to the pressure relief line upstream of the pressure relief valve and at a second end to the carbonated water valve.

15. The faucet-integrated carbonation system of claim 14, further comprising:
 a cable coupled at a first end to the carbonated water valve and at a second end to a tank valve of the carbon dioxide tank.

16. The faucet-integrated carbonation system of claim 15, wherein the carbonated water valve is a multi-way diverter valve, the system further comprising:
 an ON position in which the carbonated water waterway is fluidly coupled to the dispensing waterway;
 an OFF position in which the carbonated water waterway is disconnected from the dispensing waterway;
 a carbon dioxide charge position in which tension on the cable opens the tank valve such that carbon dioxide gas flows from the carbon dioxide tank into the carbonated water reservoir; and
 a carbonated water reservoir fill position in which the fill vent line is vented via a diverter valve to reduce a pressure prevailing in the carbonated water reservoir.

17. The faucet-integrated carbonation system of claim 7, further comprising:
 a cable coupled at a first end to the carbonated water valve and at a second end to a tank valve of the carbon dioxide tank.

18. The faucet-integrated carbonation system of claim 17, wherein the carbonated water valve is a multi-way diverter valve, the system further comprising:
 an ON position in which the carbonated water waterway is fluidly coupled to the dispensing waterway;
 an OFF position in which the carbonated water waterway is disconnected from the dispensing waterway; and
 a carbon dioxide charge position in which tension on the cable opens the tank valve such that carbon dioxide gas flows from the carbon dioxide tank into the carbonated water reservoir.

19. The faucet-integrated carbonation system of claim 7, further comprising:
 a mounting bracket for mounting the carbonated water reservoir and the carbon dioxide tank to a first side of a surface, wherein the faucet is mounted to a second side of the surface opposite the first side.

20. The faucet-integrated carbonation system of claim 7, wherein the carbonated water reservoir and the carbon dioxide tank are configured to rest on a bottom surface of a structure, wherein the faucet is mounted to a top surface of the structure.

* * * * *